(12) United States Patent
Goodman et al.

(10) Patent No.: US 7,734,031 B1
(45) Date of Patent: Jun. 8, 2010

(54) SYSTEMS AND METHODS FOR INTEGRATING PSTN AND IP APPLICATION PLATFORMS TO ENABLE ADVANCED TELEPHONY SERVICES

(75) Inventors: William David Goodman, Collegeville, PA (US); James Edward Haley, Aston, PA (US); Douglas R. Jones, Medford, NJ (US); Michael Alan Weintraub, Medfield, MA (US)

(73) Assignee: Verizon Services Corp., Arlington, VA (US)

( * ) Notice: Subject to any disclaimer, the term of this patent is extended or adjusted under 35 U.S.C. 154(b) by 1204 days.

(21) Appl. No.: 10/850,915

(22) Filed: May 20, 2004

Related U.S. Application Data (60) Provisional application No. 60/473,084, filed on May 23, 2003.

(51) Int. Cl.
H04M 7/00 (2006.01)
(52) U.S. Cl. .............................. 379/221.08; 379/221.09
(58) Field of Classification Search ............ 379/221.08, 379/205, 261, 204, 230, 260, 221.02, 221.01
See application file for complete search history.

(56) References Cited

U.S. PATENT DOCUMENTS

| | | | | | |
|---|---|---|---|---|---|
| 5,930,700 | A | * | 7/1999 | Pepper et al. | 455/435.3 |
| 5,978,672 | A | * | 11/1999 | Hartmaier et al. | 455/413 |
| 5,995,608 | A | * | 11/1999 | Detampel et al. | 379/205.01 |
| 6,205,139 | B1 | * | 3/2001 | Voit | 370/389 |
| 6,560,327 | B1 | * | 5/2003 | McConnell | 379/229 |

OTHER PUBLICATIONS

An architecture for In-internet Hybrid Services, vol. 35, Issue 5, Apr. 2001, pp. 537-549, Torino, Italy.*

Licciardi (An architecture for In-internet Hybrid Services, vol. 35, Issue 5, Apr. 2001, pp. 537-549).*

Co-pending U.S. Appl. No. 10/627,368, filed Jul. 25, 2003, entitled: "Methods and Systems for Presence-Based Telephony Communications".

* cited by examiner

*Primary Examiner*—Curtis Kuntz
*Assistant Examiner*—Amal Zenati (57) ABSTRACT

A service control point (SCP) (140) associated with a public-switched telephone network (PSTN) (110) includes a service logic module (210-N+1) and a network interface (215). The service logic module (210-N+1) enables the service control point (SCP) (140) to establish a connection with an Internet Protocol (IP) application server (120) via a transmission control protocol/Internet protocol (TCP/IP) network (105). The network interface (215) communicates via the connection to integrate telephony services between the PSTN (110) and the TCP/IP network (105).

49 Claims, 6 Drawing Sheets

SYSTEMS AND METHODS FOR INTEGRATING PSTN AND IP APPLICATION PLATFORMS TO ENABLE ADVANCED TELEPHONY SERVICES

CROSS REFERENCE TO RELATED APPLICATIONS

The instant application claims priority under 35 U.S.C. §119 based on provisional application No. 60/473,084, filed May 23, 2003, the disclosure of which is incorporated by reference herein in its entirety.

RELATED APPLICATIONS

The instant application is related to application Ser. No. 10/627,368, filed Jul. 25, 2003, now U.S. Pat. No. 7,317,716, entitled "Methods and Systems for Presence-Based Telephony Communications".

FIELD OF THE INVENTION

The present invention relates generally to telephony systems and, more particularly, to systems and methods for integrating Public Switch Telephone Network (PSTN) and Internet Protocol (IP) application platforms to enable advanced telephony services.

BACKGROUND OF THE INVENTION

At present, telephony service applications are partitioned between the Public Switched Telephone Network (PSTN) and Internet Protocol (IP) networks. That is, the PSTN, either at a service switching point (SSP) or a service control point (SCP), does not look to an IP-based application server to augment its call processing procedures. Likewise, voice over IP (VoIP) approaches assume that control, or responsibility, for a call has been completely transferred to an IP-based application server. The emphasis in interworking has been in the signaling and control plane, not the application plane. For example, PSTN subscribers are currently offered telephony services, such as Call Waiting and Call Forwarding, through features that are provided by Central Office Switching Systems vendors and their local exchange carriers. In addition, the Advanced Intelligent network (AIN) offers PSTN users an advanced set of enhanced telephony services through the use of AIN Triggers during the originating or terminating points in a call. The SCP conventionally runs service logic based on the AIN triggers and instructs the SSP on call completion.

Furthermore, VoIP may include calls originating or terminating on-IP network and calls originating or terminating off-IP network. In cases where the PSTN is involved, this usually means that a call starts or ends in the PSTN, but is sent to the IP network via a PSTN/IP gateway. Once the call transfers through this gateway, application layer responsibility for the call moves to the IP-based application server. This server works independently of the SCP. This approach, thus, is inherently inefficient for incumbent PSTN carriers and requires the deployment of an IP network capable of meeting the business/service requirements associated with voice traffic and services. Furthermore, considering the disjoint nature of PSTN/VoIP application layer evolution, no attention has been paid toward finding methods and systems to allow the application layer components in each environment (network) to leverage the developments of the other.

Therefore, there exists a need for systems and methods that can implement an integrated telephony service infrastructure that has the capability to leverage and build on the embedded AIN infrastructure and the PSTN customer base with IP application.

SUMMARY OF THE INVENTION

Systems and methods consistent with the present invention address this need, and others, by implementing integrated PSTN and packet-switched application platforms that enable the seamless use of telephony services, such as, for example, call waiting or call forwarding, across the PSTN and packet-switched networks. Consistent with the invention, additional service logic may be implemented in the application server and PSTN service control point (SCP) such that they may interact with one another to communicate subscriber telephony service data. The communicated subscriber telephony service data may be used, by either the SCP or the application server, to seamlessly route calls between subscribers across the packet-switched network and the PSTN.

In accordance with the purpose of the invention as embodied and broadly described herein, a method of routing calls based on at least one telephony service using at least one out-of-network application resource includes receiving, at a service control point (SCP), a query regarding a call for a party received in a public-switched telephone network. The method further includes requesting data related to the at least one telephony service from an application resource located out of the public-switched telephone network and routing the call based on the data related to the at least one telephony service.

In another implementation consistent with the present invention, a method of routing a call in accordance with at least one telephony service includes executing one or more call management functions with an application server in a packet-switched network and receiving a call at a service switching point in a public-switched telephone network. The method further includes requesting data related to the executed one or more call management functions from the application server and routing the call based on the requested data.

In a further implementation consistent with the present invention, a method of integrating telephony services in a public-switched telephone network (PSTN) and a transmission control protocol/Internet protocol (TCP/IP) network includes implementing functionality in a service control point (SCP) to enable the SCP to establish a connection with an application server via a TCP/IP network. The method further includes communicating via the connection to integrate telephony services between the PSTN and the TCP/IP network.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods, consistent with the present invention, integrate PSTN and packet-switched application platforms to enable the seamless use of telephony services, such as, for example, call waiting or call forwarding, across the PSTN and packet-switched networks, such as, for example, IP networks.

Exemplary Network

Figure 1:
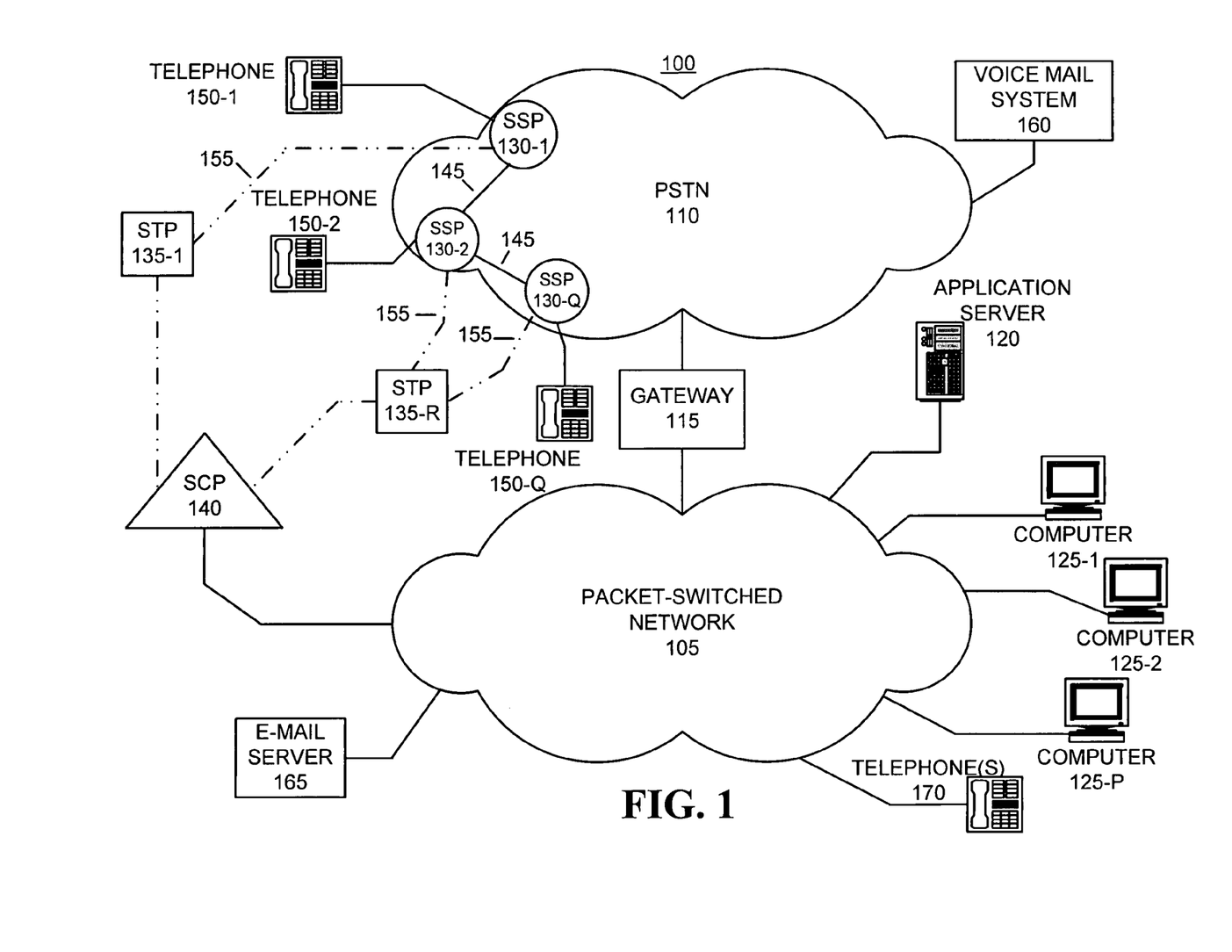
FIG. 1 illustrates an exemplary network in which systems and methods, consistent with the present invention, may be implemented.

FIG. 1 illustrates an exemplary network 100 in which systems and methods consistent with the present invention can be implemented. Network 100 may include a packet-switched network 105 interconnected with a Public Switched Telephone Network (PSTN) 110 via a gateway 115. Packet-switched network 105 may include one or more networks of any type, including a Public Land Mobile Network (PLMN), LAN, metropolitan area network (MAN), wide area network (WAN), Internet, or Intranet. In one implementation, packet-switched network 105 may include a transmission control protocol/Internet Protocol (TCP/IP) network. The PLMN may further include a packet-switched mobile network, such as, for example, a General Packet Radio Service (GPRS), Cellular Digital Packet Data (CDPD), or Mobile IP network. Gateway 115 may route data between PSTN 110 and packet-switched network 105.

An application server 120, one or more computers 125-1 through 125-P, an e-mail server 165 and a telephone(s) 170 may be connected to packet-switched network 105 using wired, wireless or optical connection links. Application server 120 may include, for example, an Internet-protocol (IP) based server and may provide service to subscribers subscribing to voice service over the packet-switched network. Such voice service may include, for example, voice over IP (VoIP) service. In some implementations, application server 120 may include a customer premises device, such as, for example, a personal computer (PC). Application server 120 may include service logic that implements various application services for serving subscribers. Application server 120 may, consistent with the invention, send and receive messages to and from SCP 140 via packet-switched network 105. E-mail server 165 may include a conventional server for sending and receiving e-mail.

PSTN 110 may include one or more service switching points (SSPs) 130-1 through 130-Q that, in conjunction with one or more signal transfer points (STPs) 135-1 through 135-R and a service control point (SCP) 140, use signaling protocols (e.g., SS7 signaling protocols) for setting up telephone calls between the one or more SSPs 130-1 through 130-Q. SSPs 130-1 through 130-Q can include conventional network nodes typically associated with central office switching units (not shown) having, for example, SS7 messaging capability. SSPs 130-1 through 130-Q may connect with one another via one or more links 145 that may include circuits for connecting calls between telephones 150-1 through 150-Q. SSPs 130-1 through 130-Q may be connected to a respective STP 135 via a link 155.

STPs 135-1 through 135-R and SCP 140 may implement functionality for routing calls between the SSPs 130-1 through 130-Q. SCP 140 may further implement functionality for interfacing with packet-switched network 105 such that it can send and receive messages to and from application server 120. A voice mail system 160 may interconnect with PSTN 110. Voice mail system 160 may also interconnect (not shown) with packet-switched network 105 and may include a conventional system for providing voice mail services to voice mail subscribers.

It will be appreciated that the number of components illustrated in FIG. 1 are provided for explanatory purposes only. A typical network may include more, fewer or different components than are illustrated in FIG. 1.

Exemplary Service Control Point (SCP)

Figure 2:
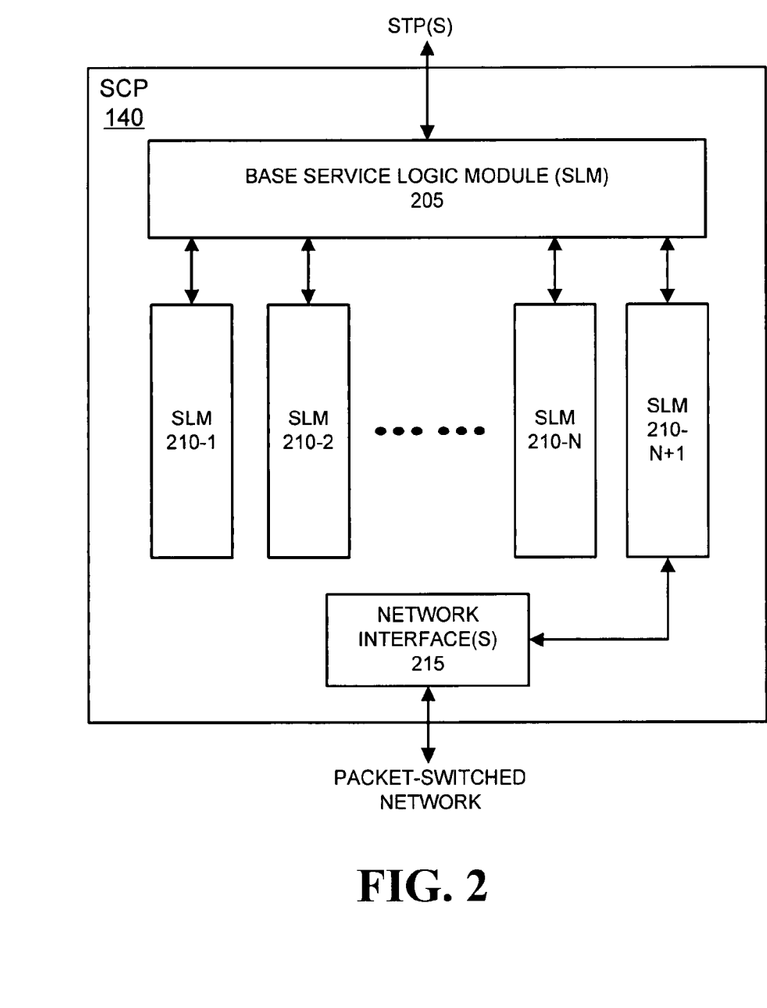
FIG. 2 illustrates an exemplary configuration of a SCP of FIG. 1 consistent with the present invention.

FIG. 2 illustrates exemplary components of a SCP 140 consistent with the present invention. SCP 140 may include a base service logic module (SLM) 205, service logic modules 210-1 through 210-N+1, and network interface(s) 215. Service logic modules 205 and 210-1 through 210-N+1 may be implemented in software (i.e., stored as instructions on a computer-readable medium and executed by a processing unit), hardware, firmware, or any combination thereof. Base SLM 205 may include the logic for basic and conventional functions of SCP 140 and may interface with STP 135-1 and STP 135-R via an SS7 interface (not shown). Service logic modules 210-1 through 210-N may include logic for additional functionality of SCP 140, such as, for example, call routing functionality for instructing a respective SSP(s) how to route a call. Service logic module 210-N+1 may include functionality for interfacing and communicating with application server 120. Service logic module 210-N+1 may use an Internet Protocol interface for communicating with application server 120, such as, for example, a Java RMI, http/XMP, SOAP, or Parlay interface, though other types of interfaces may be used. Service logic module 210-N+1 may additionally use extensible markup language (XML) data structures for communicating with application server 120. Network interface(s) 215 may interconnect SCP 140 with packet-switched network 105.

Exemplary Application Server

Figure 3:
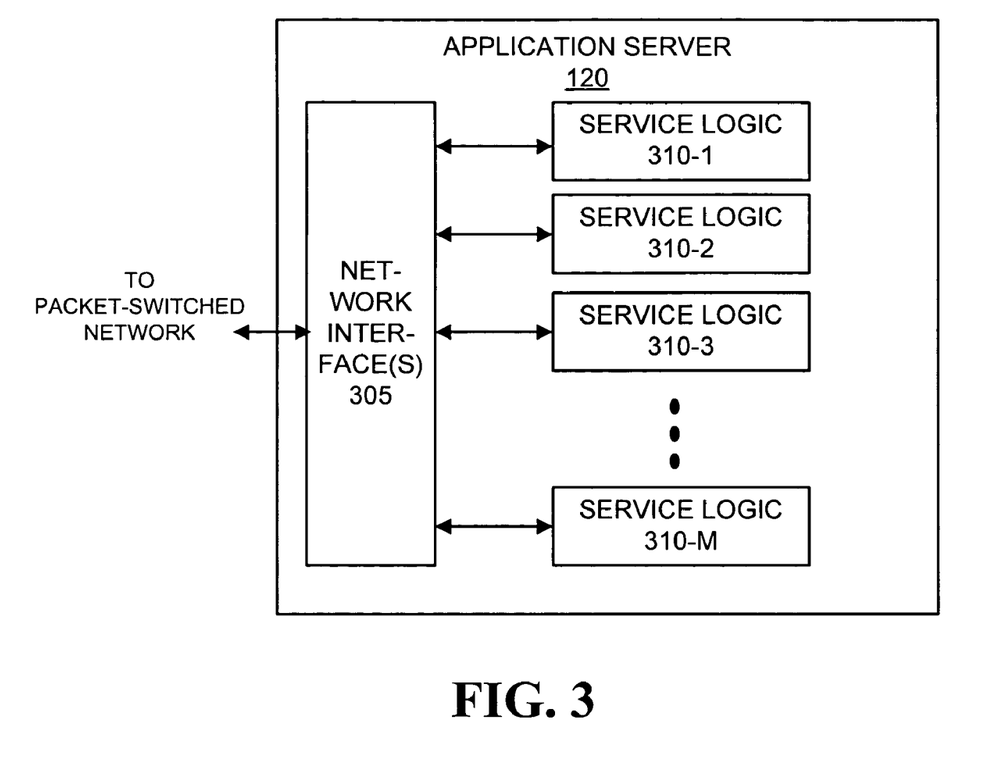
FIG. 3 illustrates an exemplary configuration of an application server of FIG. 1 consistent with the present invention.

FIG. 3 illustrates exemplary components of application server 120 consistent with the present invention. Application server 120 may include a network interface(s) 305 and service logic 310-1 through 310-M. Network interface(s) 305 may interconnect application server 120 with packet-switched network 105. Each service logic 310 may implement conventional server functions. Service logic 310-M may, additionally, implement functionality for communicating with SCP 140 via a Java RMI, http/XMP, SOAP, or Parlay interface, though other types of interfaces may be used. Service logic 210-M may further use XML data structures for communicating with SCP 140.

Exemplary Call Management Configuration Database

Figure 4:
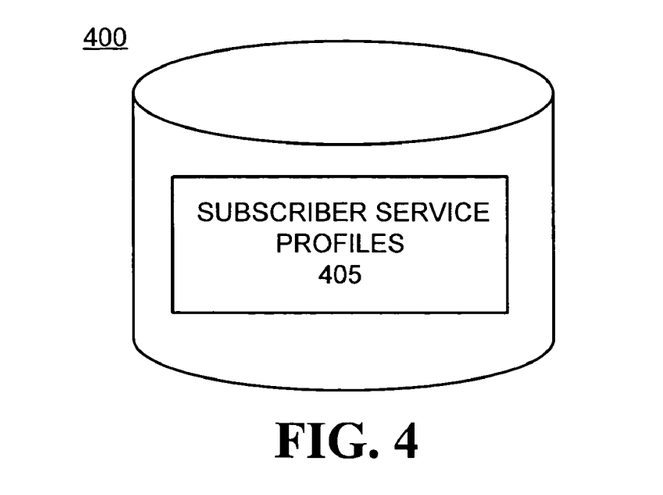
FIG. 4 illustrates an exemplary call management configuration database consistent with the present invention.

FIG. 4 illustrates an exemplary call management configuration database 400 consistent with the invention. Database 400 may be stored in a memory (not shown) associated with SCP 140 and/or application server 120. Database 400 may include subscriber service profiles 405, where each subscriber service profile identifies a subscriber by a home phone number and includes additional information regarding the subscriber's call state and which telephony services that the subscriber has activated. Such telephony services may include, for example (but are not limited to), a "do not disturb" service, a call waiting service, a call forwarding service, and/or a "follow-me" service. A "do not disturb" service may indicate that a subscriber does not wish to receive calls and may, for example, forward calls to voice mail system 160. A "follow-me" service may be available as an AIN or an IP-based service. With "follow-me," a subscriber sets up a profile that describes an order of destination end-points in which a call to that subscriber should be routed. Often, these services involve ringing one phone line, and if the call is not answered (or possibly is busy), then another. This continues until either the call is answered or the service runs through all of the telephone numbers given in the profile. Another form of "follow-me" service is a "one number service," where callers dial one publicly advertised telephone number and the service forwards all calls to a location of the subscriber's choosing.

Exemplary Call Configuration Management Process

Figure 5:
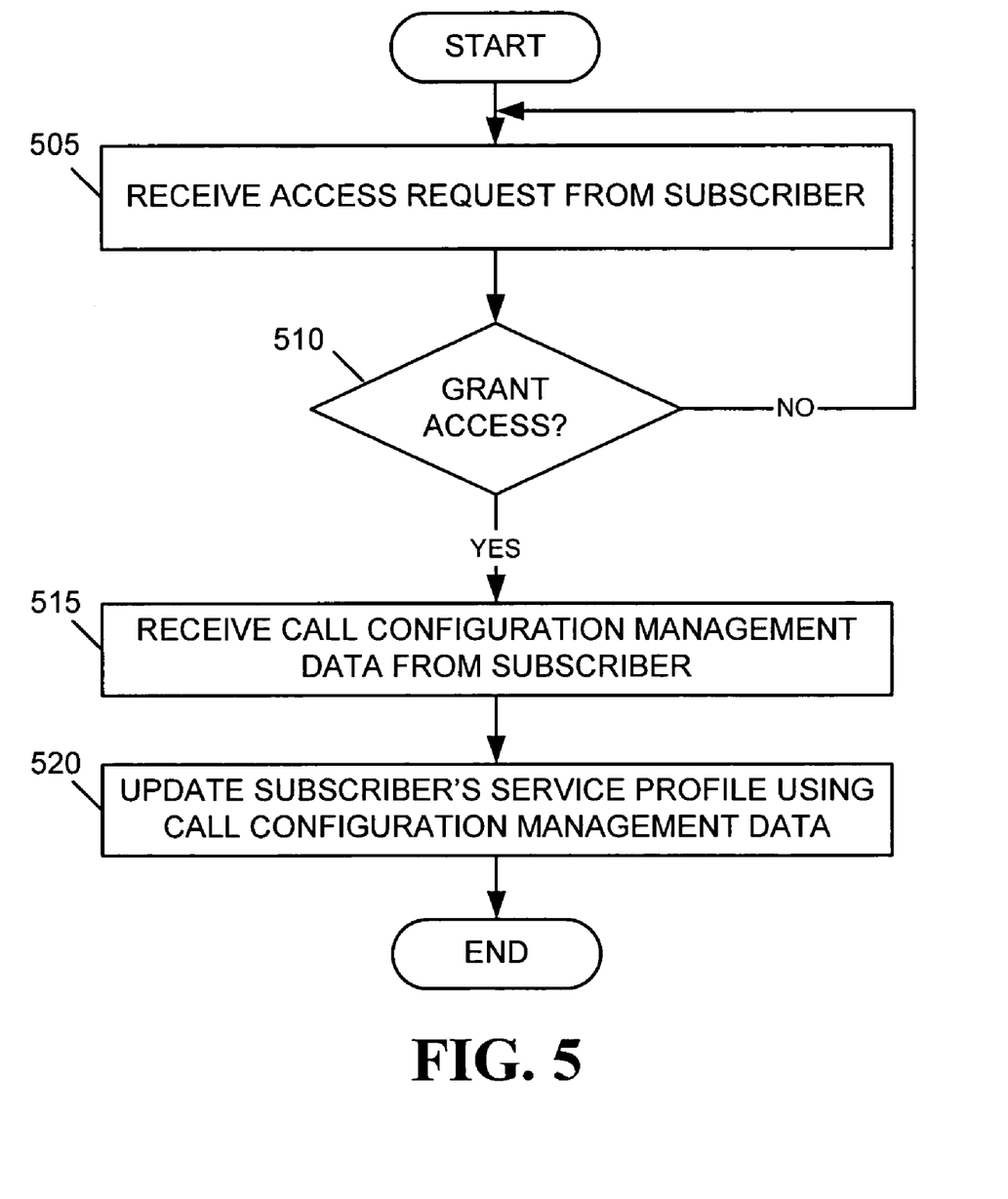
FIG. 5 is a flow chart that illustrates an exemplary call management configuration process consistent with the present invention.

FIG. 5 is a flowchart that illustrates an exemplary process, consistent with the present invention, for implementing a call configuration management process in which a remote subscriber can initiate and configure advanced telephony services applicable to his telephone and/or computer. The exemplary process of FIG. 5 may be implemented at application server 120, or, alternatively, at SCP 140. The exemplary process of FIG. 5 may be implemented in hardware, software, firmware, or any combination thereof.

The exemplary call configuration management process may begin with the receipt of an access request from a subscriber [act 505]. If the exemplary process is implemented at SCP 140, the access request may be received from a subscriber via a telephone user interface (TUI) of an Intelligent peripheral (IPe), such as, for example, an interactive voice response unit (IVR) that uses DTMF to signal an access request from the subscriber to SCP 140. SCP 140 may direct the We to provide the TUI to interact with the subscriber and to provide the results back to SCP 140. If the exemplary process is implemented at application server 120, the access request may be received from the subscriber via a graphical user interface (GUI) implemented at the subscriber's own computer. A determination may then be made as to whether access is to be granted [act 510]. SCP 140 or application server 120 may check a username and/or password in the access request to determine if access should be granted to the subscriber. SCP 140 or application server 120 may also correlate the number from which the call is made to a subscriber to determine whether access should be granted. SCP 140 may access a database (not shown) that associates the caller with the services to which the caller subscribes.

If access is to be granted, call configuration management data may be received from the subscriber [act 515]. The call configuration management data may be received at SCP 140 via a TUI of an IPe, or at application server 120 via a GUI, and may indicate which advanced telephony services that the subscriber wishes to activate, or deactivate, and may include appropriate data corresponding to the activated telephony services. For example, if the subscriber is busy and doesn't wish to be disturbed, the subscriber may activate a "do not disturb" or "call waiting" feature for his telephone that will automatically forward any calls to his voice mail. As another example, the subscriber may activate "call forwarding" and include another telephone number to which he wishes any calls to be forwarded. As yet another example, the subscriber may activate a "follow-me" service in which the subscriber can set up a profile that may include multiple locations, with corresponding telephone numbers, at which the subscriber can be reached. For example, the subscriber's profile may include three different locations, work, telecommuting and cellular, with work including his work telephone number, telecommuting including his home office telephone number and cellular including his cell phone number.

The subscriber's service profile may then be updated using the received call configuration management data [act 520]. Various features, such as "call waiting," "call forwarding," "follow-me," and/or "do not disturb" may be flagged in the subscriber's service profile and corresponding data, such as forwarding telephone numbers may be entered.

Exemplary SCP-to-Application-Server Call Handling Process

Figure 6:
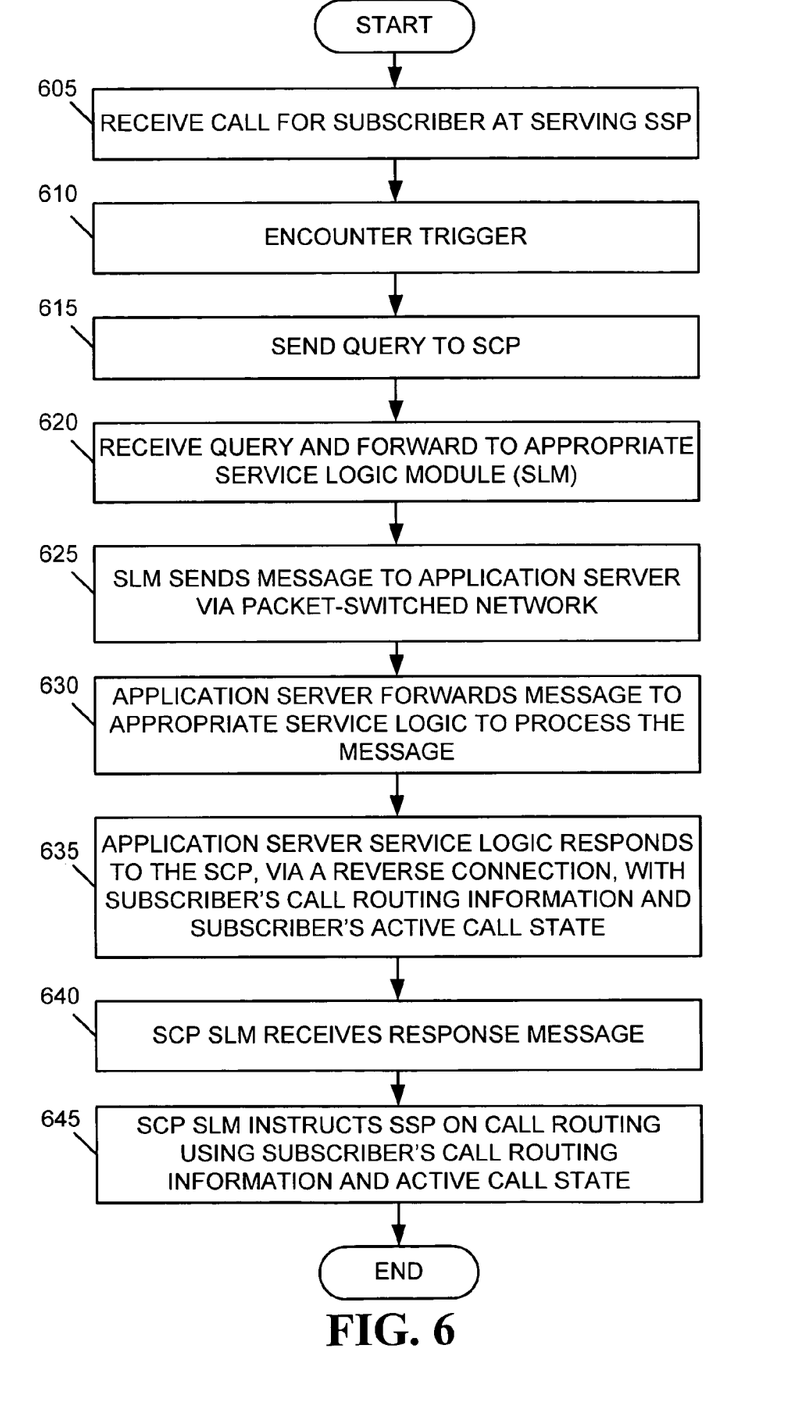
FIGS. 6 and 7 are flow charts that illustrate exemplary call handling processes, consistent with the present invention, for implementing advanced telephony services.

FIG. 6 is a flowchart that illustrates an exemplary process, consistent with the present invention, for handling call routing at SCP 140 using call configuration data from application server 120. The exemplary process of FIG. 6 may be implemented at application server 120 and/or SCP 140, as appropriate. The exemplary process of FIG. 6 may be implemented in hardware, software, firmware, or any combination thereof.

The exemplary SCP-to-application-server call handling process may begin with the receipt of a call for a subscriber at a serving SSP 130 [act 605]. SSP 130 may serve the calling subscriber or the called subscriber. For example, subscriber B (calling party), a subscriber to a VoIP service in packet-switched network 105, may call subscriber A (called party), a subscriber to voice service in PSTN 110. As another example, a subscriber C (calling party) to a voice service in PSTN 110 may call subscriber D (called party), a subscriber to a VoIP service in packet-switched network 105 or to a voice service in PSTN 110. The call may then encounter an Advanced Intelligent Network (AIN) termination attempt trigger (TAT) at the called subscriber's serving SSP 130 or the calling party's serving SSP 130 [act 610]. The SSP 130 may send a query to SCP 140 via a STP 135 [act 615]. SCP 140 may receive the query and forward the query to, for example, SLM 210-N+1 [act 620]. SLM 210-N+1 may send a message to application server 120 via packet-switched network 105 [act 625]. The message sent by SLM 210-N+1 to application server 120 may include call detail data that, for example, indicates the called and calling parties and requests call routing and active call state information that corresponds to the called party (e.g., subscriber A). Application server 120 may receive the message from SLM 210-N+1 and forward the message to, for example, service logic 310-M for message processing [act 630].

Service logic 310-M may retrieve data from the subscriber's service profile and determine the subscriber's call routing and active call state information. For example, if subscriber A has previously activated "call forwarding" service, service logic 310-M may determine that subscriber A's active call state is "accepting calls" and that the call routing information includes the telephone number of the telephone to which his calls are to be forwarded. As another example, if subscriber A has previously activated a "follow-me" service and selected "telecommuting" in his service profile, service logic 310-M may determine that subscriber A's active call state is "accepting calls" and that the call routing information includes the telephone number of his home office from which he is telecommuting. As a further example, if subscriber A has previously activated a "do not disturb" feature in his service profile, service logic 310-M may determine that subscriber A's active call state is "not accepting calls" and that the call routing information includes the number of the subscriber's voice mail system 160. If the "do not disturb" feature is activate in subscriber A's service profile, then service logic 310-M may additionally send an SMTP message to e-mail server 165 that may notify subscriber A that he has a voice mail message in queue. Furthermore, if subscriber A is "logged on" at a computer 125, service logic 310-M may send a real-time call log and a caller identification (ID) screen display ("pop") to the computer.

Application server service logic 310-M may then respond to SCP 140, via a reverse connection, with the subscriber's determined call routing information and active call state [act 635]. The SCP SLM 210-N+1 receives the response message via network interface(s) 215 [act 640]. The SCP SLM 210-N+1 may extract data from the message and instruct SSP 130 on routing the call using the subscriber's call routing information and active call state [act 645]. For example, SLM 210-N+1 may instruct SSP 130 to route the call to a "call forwarding" telephone number, to voice mail system 160, or to subscriber A's telecommuting number activated in his "follow-me" service.

Exemplary Application Server-to-SCP Call Handling Process

Figure 7:
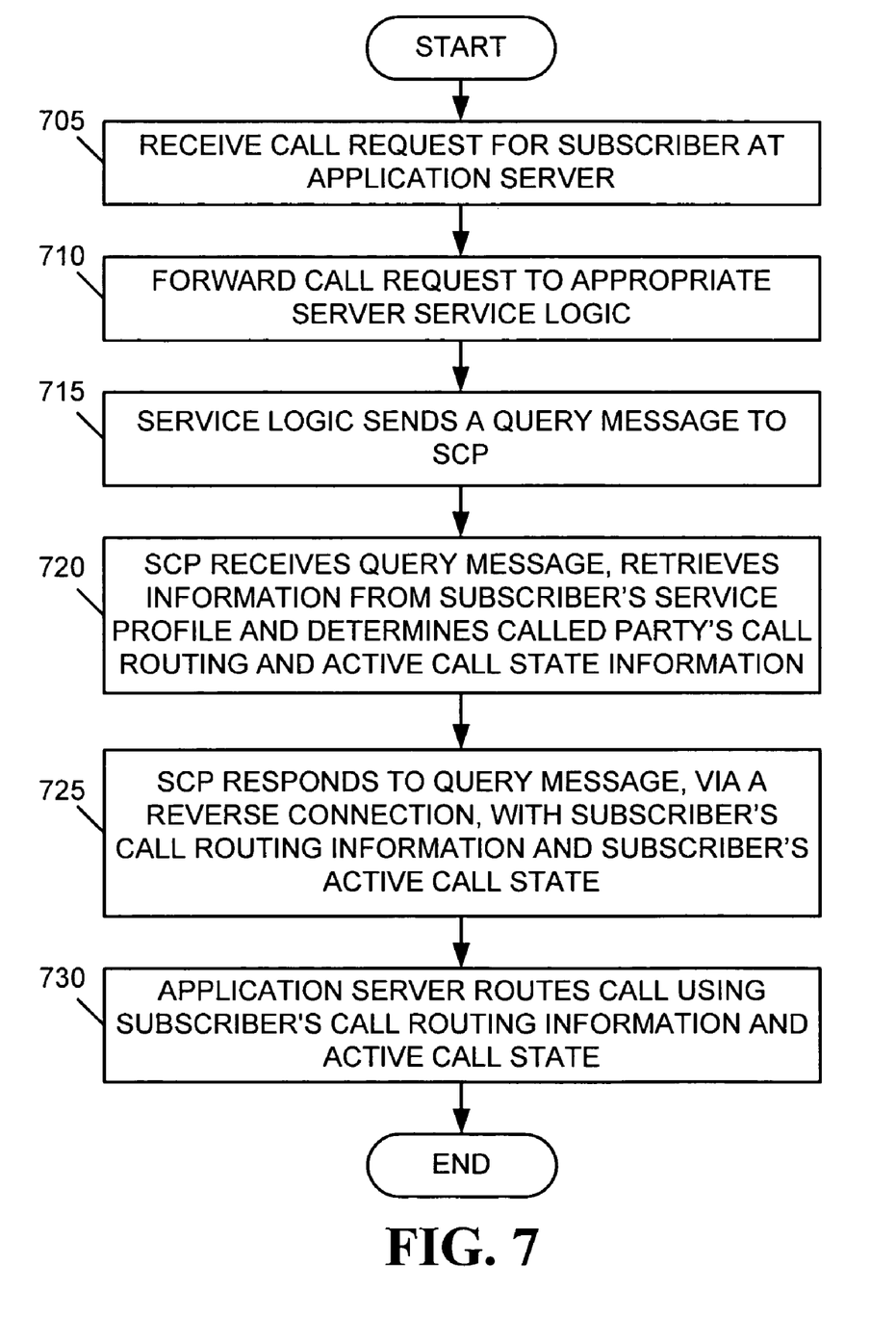

FIG. 7 is a flowchart that illustrates an exemplary process, consistent with the present invention, for handling call routing at application server 120 using call configuration data from SCP 140. The exemplary process of FIG. 7 may be implemented at application server 120 and/or SCP 140, as appropriate. The exemplary process of FIG. 7 may be implemented in hardware, software, firmware, or any combination thereof.

The exemplary application server-to-SCP call handling process may begin with the receipt of a call request for a subscriber at network interface(s) 305 of application server 120 [act 705]. For example, subscriber B (calling party), a subscriber to a VoIP service in packet-switched network 105, may be attempting to call subscriber A (called party), a subscriber to a voice service in PSTN 110 and a call request may be sent to application server 120. The call request may be forwarded to the appropriate application server service logic (e.g., service logic 310-M) for handling application server-to-SCP interactions [act 710]. Responsive to receiving the call request, service logic 310-M may send a query message to SCP 140 via packet-switched network 105 [act 715] requesting call routing and active call state information associated with the called party. SCP 140 may receive the query message, retrieve the information from the called party's service profile and determine the called party's call routing information and active call state [act 720]. For example, if subscriber A has previously activated "call forwarding" service, service logic 310-M may determine that subscriber A's active call state is "accepting calls" and that the call routing information includes the telephone number of the telephone to which his calls are to be forwarded. As another example, if subscriber A has previously activated a "follow-me" service and selected "telecommuting" in his service profile, service logic 310-M may determine that subscriber A's active call state is "accepting calls" and that the call routing information includes the telephone number of his home office from which he is telecommuting. As a further example, if subscriber A has previously activated a "do not disturb" feature in his service profile, service logic 310-M may determine that subscriber A's active call state is "not accepting calls" and that the call routing information includes the number of the subscriber's voice mail system 160.

SCP 140 may then respond to the message from application server 120, via a reverse connection, with the subscriber's call routing information and the subscriber's active call state [act 725]. Upon receipt of the response from SCP 140, application server 120 may route the call using the subscriber's call routing information and active call state [act 730]. For example, service logic 310-M may route the call to a "call forwarding" telephone number, to voice mail system 160, or to subscriber A's telecommuting number activated in his "follow-me" service.

CONCLUSION

Systems and methods consistent with the present invention implement an integrated telephony service infrastructure that has the capability to leverage and build on the embedded AIN infrastructure and the PSTN customer base with IP application servers. The integrated PSTN and packet-switched application platforms enable the seamless use of telephony services, such as, for example, call waiting or call forwarding, across the PSTN and packet-switched networks.

The foregoing description of embodiments of the present invention provides illustration and description, but is not intended to be exhaustive or to limit the invention to the precise form disclosed. Modifications and variations are possible in light of the above teachings or may be acquired from practice of the invention. For example, while some implementations of the invention have described the interconnection of an SCP 140 and an application server 120 as being in response to originating or terminating calls in either PSTN 110 or packet-switched network 105, mid-call events may initiate the interconnection of SCP 140 and application server 120 for the purpose of integrating telephony services. Such a mid-call event, for example, may include initiation of "flash" by the called or calling party. While series of acts have been described with respect to FIGS. 6-8, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method of routing calls based on at least one telephony service using at least one out-of-network server, comprising:
   receiving, at a service control point (SCP), a query regarding a call for a party received in a public-switched telephone network;
   requesting data related to the at least one telephony service from a server located out of the public-switched telephone network, wherein the data includes a subscriber-defined service profile identifying a currently activated telephony service based on a flag set in the service profile by the subscriber, and wherein a telephone user interface is used to update a setting in a call management configuration database storing the service profile, and the flag is set based on the setting; and routing the call by reading the flag to determine the currently activated telephony service, wherein the call is routed to a telephone number included in the service profile when the flag is determined to be set to accepting the call, and the call is routed to voice mail and an email notification is sent when the flag is determined to be set to not accepting the call, and wherein the call routing is performed by service logic modules contained within the SCP, the service logic modules performing the call routing by communicating with service logic contained in the server.

2. The method of claim 1, wherein the at least one telephony service comprises a call waiting service.

3. The method of claim 1, wherein routing the call to the voice mail includes routing the call to a voice mail system associated with the party based on the data related to the at least one telephony service.

4. The method of claim 1, wherein sending the email notification includes sending a message to an e-mail server to notify the party to check their voice mail system for a voice mail message.

5. The method of claim 1, wherein the at least one telephony service comprises a call forwarding service.

6. The method of claim 1, wherein the at least one telephony service comprises a "follow me" service.

7. The method of claim 1, wherein the server comprises an Internet Protocol (IP) server.

8. The method of claim 1, wherein the server is located in a packet-switched network.

9. The method of claim 8, wherein the packet-switched network comprises an Internet Protocol (IP) network.

10. The method of claim 9, wherein the IP network comprises an Internet.

11. A service control point (SCP) coupled to a public-switched telephone network, comprising:
a network interface;
a logic device configured to:
receive a query regarding a call for a party received in a public-switched network, and
forwarding the query to a designated service logic module, wherein the designated service logic module is configured to:
request, via the network interface, data related to at least one telephony service from a server located out of the public-switched telephone network, wherein the data includes a subscriber-defined service profile identifying a currently activated telephony service based on a flag set in the service profile by the subscriber, and wherein a telephone user interface is used to update a setting in a call management configuration database storing the service profile, and the flag is set based on the setting; and
receive the requested data from the server via the network interface, and
route the call by reading the flag to determine the currently activated telephony service, wherein the call is routed to a telephone number included in the service profile when the flag is determined to be set to accepting the call, and the call is routed to voice mail and an email notification is sent when the flag is determined to be set to not accepting the call, and wherein the call routing is performed by service logic modules contained within the SCP, the service logic modules performing the call routing by communicating with service logic contained in the server.

12. The SCP of claim 11, wherein the at least one telephony service comprises a call forwarding service.

13. The SCP of claim 11, wherein the at least one telephony service comprises a "follow me" service.

14. The SCP of claim 11, wherein the server comprises an Internet Protocol (IP) server.

15. The SCP of claim 11, wherein the server is located in a packet-switched network.

16. The SCP of claim 15, wherein the packet-switched network comprises an IP network.

17. The SCP of claim 16, wherein the IP network comprises an Internet.

18. A computer-readable medium containing instructions for controlling at least one processor to perform a method of routing calls based on at least one telephony service using at least one out-of-network server, the method comprising:
receiving, at a service control point (SCP), a query regarding a call for a party received in a public-switched telephone network;
requesting data related to the at least one telephony service from a server located out of the public-switched telephone network, wherein the data includes a subscriber-defined service profile identifying a currently activated telephony service based on a flag set in the service profile by the subscriber, and wherein a telephone user interface is used to update a setting in a call management configuration database storing the service profile, and the flag is set based on the setting; and
routing the call by reading the flag to determine the currently activated telephony service, wherein the call is routed to a telephone number included in the service profile when the flag is determined to be set to accepting the call, and the call is routed to voice mail and an email notification is sent when the flag is determined to be set to not accepting the call, and
wherein the call routing is performed by service logic modules contained within the SCP, the service logic modules performing the call routing by communicating with service logic contained in the server.

19. A method of routing a call in accordance with at least one telephony service comprising:
receiving a call at a service switching point in a public-switched telephone network;
requesting data related to the executed one or more call management functions from an application server, the data including a flag set in a service profile by a subscriber to identify a routing setting, wherein a telephone user interface is used to update a setting in a call management configuration database storing the service profile, and the flag is set based on the setting; and
routing the call based on the requested data and by reading the flag to determine the routing setting, wherein the call is routed to a telephone number included in the service profile when the flag is determined to be set to accepting the call, and the call is routed to voice mail and an email notification is sent when the flag is determined to be set to not accepting the call, and
wherein the call routing is performed by service logic modules contained within the SCP, the service logic modules performing the call routing by communicating with service logic contained in the server.

20. The method of claim 19, wherein routing the call to voicemail includes routing the call to a voice mail system associated with a called party based on the data related to the executed one or more call management functions.

21. The method of claim 19, wherein sending the email notification includes sending a message to an e-mail server to notify the called party to check a voice mail system for a voice mail message.

22. The method of claim 19, wherein executing the one or more call management functions comprises executing a call waiting service.

23. The method of claim 19, wherein executing the one or more call management functions comprises executing a call forwarding service.

24. The method of claim 19, wherein executing the one or more call management functions comprises executing a "follow me" service.

25. The method of claim 19, wherein the requested data comprises at least one of a subscriber's call routing information and a subscriber's active call state.

26. An Internet Protocol (IP) application server coupled to a transmission control protocol/IP (TCP/IP) network, comprising:
first service logic configured to execute call management functions with a subscriber via the TCP/IP network, wherein the call management function includes a telephony service;
a network interface configured to receive a first message associated with a call in a public-switched telephone network from a service control point (SCP), the message requesting data related to the executed call management functions, wherein the data includes a subscriber-defined service profile identifying a currently activated telephony service based on a flag set in the service profile by the subscriber, and wherein a telephone user interface is used to update a setting in a call management configuration database storing the service profile, and the flag is set based on the setting; and
second service logic configured to:
send to the SCP, via the network interface, a second message comprising the data related to the executed call management functions, the data comprising call routing information obtained by reading the flag to determine the currently activated telephony service, the first service logic communicating with the second service logic in order to perform call routing, wherein a call is routed to a telephone number included in the service profile when the flag is determined to be set to accepting the call, and
wherein the call is routed to voice mail and an email notification is sent when the flag is determined to be set to not accepting the call.

27. The server of claim 26, wherein executing the one or more call management functions comprises executing a call waiting service.

28. The server of claim 26, wherein executing the one or more call management functions comprises executing a call forwarding service.

29. The server of claim 26, wherein executing the one or more call management functions comprises executing a "follow me" service.

30. The server of claim 26, wherein the requested data comprises at least one of the subscriber's call routing information and the subscriber's active call state.

31. A method of integrating telephony services in a public-switched telephone network (PSTN) and a transmission control protocol/Internet protocol (TCP/IP) network, comprising:
implementing functionality in a service control point (SCP) to enable the SCP to establish a connection between service logic modules contained within the SCP and service logic contained in an application server via the TCP/IP network, wherein the SCP requests data including a subscriber-defined service profile identifying a currently activated telephony service based on a flag set in the service profile by the subscriber, and wherein a telephone user interface is used to update a setting in a call management configuration database storing the service profile, and the flag is set based on the setting; and
communicating via the connection to integrate telephony services between the PSTN and the TCP/IP network by reading the flag to determine the currently activated telephony service; and
integrating the telephony services by:
routing a call to a telephone number included in the service profile when the flag is determined to be set to accepting the call; and
routing the call to voice mail and sending an email notification when the flag is determined to be set to not accepting the call.

32. The method of claim 31, wherein the telephony services comprise at least one of a call waiting service, a call forwarding service and a "follow-me" service.

33. The method of claim 31, wherein the SCP communicates with the application server via the connection to request at least one of call routing information and active call state associated with a telephony service subscriber.

34. The method of claim 31, further comprising:
routing a call to the telephony service subscriber based on the at least one of call routing information and active call state.

35. A service control point (SCP) associated with a public-switched telephone network (PSTN), comprising:
a service logic module configured to enable the SCP to establish a connection between service logic modules contained within the SCP and service logic contained in an Internet Protocol (IP) application server via a transmission control protocol/Internet protocol (TCP/IP) network;
a database module configured to provide subscriber defined service profiles to the SCP, the service profiles including flags set by the subscriber to identify routing settings, wherein a telephone user interface is used to update a setting in a the database module storing the service profiles, and one of the flags are set based on the setting; and
a network interface configured to communicate directly via the connection to integrate telephony services between the PSTN and the TCP/IP network by reading the flags to determine the routing settings, wherein the telephony services are integrated by:
routing a call to a telephone number included in one of the service profiles when one of the flags is determined to be set to accepting the call; and
routing the call to voice mail and sending an email notification when one of the flag is determined to be set to not accepting the call.

36. A system for integrating subscriber-defined telephony services in a public-switched telephone network (PSTN) and a transmission control protocol/Internet protocol (TCP/IP) network, comprising:
means for storing a plurality of user-defined subscriber profiles in a subscriber profile database;
means for receiving an access request from a subscriber to update said subscriber's subscriber profile;
means for determining whether to grant the subscriber's access;

means for receiving call configuration management data, including user selected telephony services, from the subscriber, the call configuration management data being used to set a flag in the subscriber profile, the flag identifying the selected telephony services, wherein a telephone user interface is used to provide the call configuration management data to update a setting in a call management configuration database storing the subscriber profile, and the flag is set based on the setting;

means for updating the subscriber profile in the subscriber profile database;

means for enabling a service control point (SCP) to establish a connection between service logic modules contained within the SCP and service logic contained in an application server via a TCP/IP network; and means for communicating via the connection to integrate telephony services between the PSTN and the TCP/IP network by reading the flag to implement the selected telephone services, wherein the telephony services are integrated by:

routing a call to a telephone number included in one of the subscriber profile when the flag is determined to be set to accepting the call; and routing the call to voice mail and sending an email notification when the flag is determined to be set to not accepting the call.

37. A method of routing calls based on at least one telephony service using at least one out-of-network server, comprising:

receiving, at a server in a packet-switched network, a query regarding a call for a party received in the packet-switched network;

requesting data related to the at least one telephony service from a server located out of the public-switched telephone network, wherein the data includes a subscriber-defined service profile identifying a currently activated telephony service based on a flag set in the service profile by the subscriber, and wherein a telephone user interface is used to update a setting in a call management configuration database storing the service profile, and the flag is set based on the setting; and routing the call by reading the flag to determine the currently activated telephony service, wherein the call is routed to a telephone number included in the service profile when the flag is determined to be set to accepting the call, and the call is routed to voice mail and an email notification is sent when the flag is determined to be set to not accepting the call, and wherein the call routing is performed by service logic modules contained within the SCP, the service logic modules performing the call routing by communicating with service logic contained in the server.

38. The method of claim 37, wherein the at least one telephony service comprises a call waiting service.

39. The method of claim 37, wherein routing the call to voice mail includes routing the call to a voice mail system associated with the party according to the currently activated telephony service.

40. The method of claim 37, wherein sending the email notification includes sending a message to an e-mail server to notify the party to check their voice mail system for a voice mail message.

41. The method of claim 37, wherein the at least one telephony service comprises a call forwarding service.

42. The method of claim 37, wherein the at least one telephony service comprises a "follow me" service.

43. The method of claim 37, wherein the server comprises an Internet Protocol (IP) server.

44. The method of claim 37, wherein the packet-switched network comprises an Internet Protocol (IP) network.

45. The method of claim 44, wherein the IP network comprises an Internet.

46. A method of integrating telephony services in a transmission control protocol/Internet protocol (TCP/IP) network and a public-switched telephone network (PSTN), comprising:

implementing functionality in an application server to enable the application server to establish a connection with a service control point (SCP) via the TCP/IP network, wherein the SCP requests data including a subscriber-defined service profile identifying a currently activated telephony service based on a flag set in the service profile by the subscriber, and wherein a telephone user interface is used to update a setting in a call management configuration database storing the service profile, and the flag is set based on the setting; and communicating between service logic modules contained within the SCP and service logic contained in the server via the connection to integrate telephony services between the TCP/IP network and the PSTN by reading the flag to determine the currently activated telephony service, wherein the telephony services are integrated by:

routing a call to a telephone number included in one of the subscriber profile when the flag is determined to be set to accepting the call; and routing the call to voice mail and sending an email notification when the flag is determined to be set to not accepting the call.

47. The method of claim 46, wherein the telephony services comprise at least one of a call waiting service, a call forwarding service and a "follow-me" service.

48. The method of claim 46, wherein the application server communicates with the SCP via the connection to request at least one of call routing information and active call state associated with a telephony service subscriber.

49. The method of claim 46, further comprising:

routing a call to the telephony service subscriber based on the at least one of call routing information and active call state.

* * * * *